United States Patent [19]

Böder

[11] Patent Number: 4,594,722

[45] Date of Patent: Jun. 10, 1986

[54] GRAPHITE ELECTRODE FOR ARC FURNACES AND METHOD FOR MANUFACTURING SAME

[75] Inventor: Horst Böder, Biberbach, Fed. Rep. of Germany

[73] Assignee: Sigri GmbH, Augsburg, Fed. Rep. of Germany

[21] Appl. No.: 735,572

[22] Filed: May 17, 1985

[30] Foreign Application Priority Data

May 22, 1984 [DE] Fed. Rep. of Germany ....... 3418934

[51] Int. Cl.$^4$ ............................................. H05B 7/14
[52] U.S. Cl. .............................. 373/91; 403/DIG. 5
[58] Field of Search ............... 373/91, 92, 88, 93; 403/296, 292, 305, 306, DIG. 5

[56] References Cited

U.S. PATENT DOCUMENTS

| | | | |
|---|---|---|---|
| 1,018,003 | 2/1912 | Redlich | 373/92 |
| 1,304,444 | 5/1919 | Bidelman | 373/92 |
| 2,527,294 | 1/1949 | Bailey | |
| 2,603,669 | 10/1948 | Chappell | |
| 4,495,624 | 1/1985 | Reimpell et al. | 373/92 |

FOREIGN PATENT DOCUMENTS

| | | |
|---|---|---|
| 2559374 | 7/1977 | Fed. Rep. of Germany . |
| 2722438 | 11/1978 | Fed. Rep. of Germany . |
| 1548046 | 7/1979 | United Kingdom . |
| 1566369 | 4/1980 | United Kingdom . |

*Primary Examiner*—Roy N. Envall, Jr.
*Attorney, Agent, or Firm*—Herbert L. Lerner; Laurence A. Greenberg

[57] ABSTRACT

Graphite electrode for arc furnaces composed of a plurality of graphite electrode parts comprising a plurality of electrode sections connected by threaded graphite nipples, wherein at least one part of a graphite electrode has a plurality of graphite-filament yarn tensionally connected to the electrode part.

28 Claims, 6 Drawing Figures

GRAPHITE ELECTRODE FOR ARC FURNACES AND METHOD FOR MANUFACTURING SAME

BACKGROUND OF THE INVENTION

1. Field of the Invention

The invention relates to a graphite electrode for arc furnaces with several electrode sections connected by threaded nipples.

2. Description of the Prior Art

Graphite electrodes used in arc furnaces and arc reduction furnaces are as a rule composed of several electrode sections connected to each other (this term is understood in the following to also include electrodes which consist predominantly of carbon and have not been subjected to a graphitizing treatment). The connecting means are predominantly conical, double-conical or cylindrical threaded nipples of the same material. The nipple is screwed into box-like recesses which start from the end faces of the electrode sections and are provided with threads. Since the cross-section of the nipple accounts for only a part of the electrode cross-section it is generally necessary to increase the strength of the nipple beyond that of the adjacent electrode sections. For this purpose, only selected materials are used for making the nipple and the accessible pore volume is decreased by impregnation with pitch or other impregnating media. One detrimental consequence of this method is an increase of the radial thermal coefficient of expansion and of the modulus of elasticity and thereby, a noticeable reduction of the resistance to sudden temperature changes (temperature shock resistance). Like the overall electrode, the screw connections between the electrode sections are subjected to large temperature variations and temperature gradients during the operation of the electrode arc furnaces, particularly in the production of steel. With the customary fast heating, tangential stresses are generated in the box wall, i.e. recess wall due to radial temperature differences and the material difference between the nipple and the electrode section. Also tension stresses occur while the electrode is cooling down, for instance to connect a nipple of a new electrode section, by shrinking the box into the nipple. Thus, both the stresses caused by fast heating and by cooling down can cause the box wall to break. Another widespread defect is the fracture of the nipple itself which in double-conical nipples happens more frequently in the equatorial plane. Causes of the fracture are tensional stresses which are generated by different thermal coefficients of expansion of the nipple and the electrode sections in the longitudinal direction. Since electrode fractures increase the consumption of electrodes and, above all lead to interruptions of the furnace operation, it has been attempted repeatedly to reduce the tension build-up within the electrode and the fracture rate by structural and material changes of the electrode parts and the connections between the parts. It has, for instance, been proposed to limit radial and tangential stresses due to abrupt temperature changes by means of slots or notches which are made in electrode sections and threaded nipples and run substantially parallel to their longitudinal axis (U.S. Pat. Nos. 2,527,294; 2,603,669). According to other proposals, stress concentrations are to be prevented by specially designed screw threads, for instance, by a screw thread with a continuously changing thread depth (German Patent No. 25 55 683). Disadvantages of the proposed practice are the deviation from standard threads and a reduction of the static fracture load of the electrode strand. Among the attempts to solve the fracture problem, it has been proposed to increase the strength of electrode sections and nipples substantially, particularly by working carbon fibers into the material customarily consisting of graded petroleum coke and a pitch binder for producing these products (German No. DE-OS 26 59 374). Carbon fibers are used because of their great strength and stiffness primarily for reinforcing synthetic resins, as well as metallic and ceramic materials. In the compounds used in the manufacture of the electrode sections and nipples, it is extremely difficult, however, to uniformly distribute the carbon fibers, which are added in an amount of about 1%, since in addition, a major part of the relatively brittle fibers breaks in this treatment, the effect obtained is small, i.e. the fracture rate of electrode sections is not reduced appreciably.

SUMMARY OF THE INVENTION

It is therefore an object of the invention to increase the strength of a graphite electrode formed by several electrode sections, and particularly the strength of the connections between the sections, and further to prevent the electrode from fracturing, or at least to reduce the frequency of fractures substantially.

With the foregoing and other objects in view, there is provided in accordance with the invention a graphite electrode for arc furnaces composed of electrode graphite parts comprising a plurality of graphite electrode sections connected by threaded graphite nipples, with at least one electrode graphite part having a plurality of graphite filament yarn stretched around and tensionally connected to the electrode part.

In accordance with the invention, there is provided a threaded graphite nipple for an electric arc furnace electrode comprising a plurality of graphic electrode sections connected by threaded graphite nipples, in which graphite filament yarn is tensionally connected to the threaded graphite nipple.

There is provided in accordance with the invention a graphite electrode section for an electric arc furnace electrode comprising a plurality of graphite electrode sections connected by threaded graphite nipples, in which graphite filament yarn is disposed in holes in the graphite electrode section and tensionally connected to the graphite electrode section.

Further in accordance with the invention, there is provided a method for manufacturing a graphite electrode for arc furnaces by connecting a plurality of graphite electrode sections with threaded graphite nipples, the improvement comprising, prior to connecting a threaded graphite nipple to graphite electrode sections, depositing graphite filament yarn under stress into the threads of the threaded graphite nipple, cementing the yarn and the threaded nipple to each other with an adhesive, and heating to thermally stabilize the adhesive.

In accordance with another embodiment of the invention, there is provided a method for manufacturing a graphite electrode for arc furnaces by connecting a plurality of graphite electrode sections with threaded graphite nipples, the improvement comprising, forming axial holes in a graphite electrode section prior to connecting the electrode section to a threaded nipple, drawing stressed graphite filament yarn into the holes, cementing the yarn to the electrode section with an adhesive, and heating to thermally stabilize the adhesive.

Other features which are considered as characteristic for the invention are set forth in the appended claims.

Although the invention is illustrated and described herein as embodied in a graphite electrode for arc furnaces and method for manufacturing same, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DESCRIPTION OF THE PREFERRED EMBODIMENTS

Figure 1:
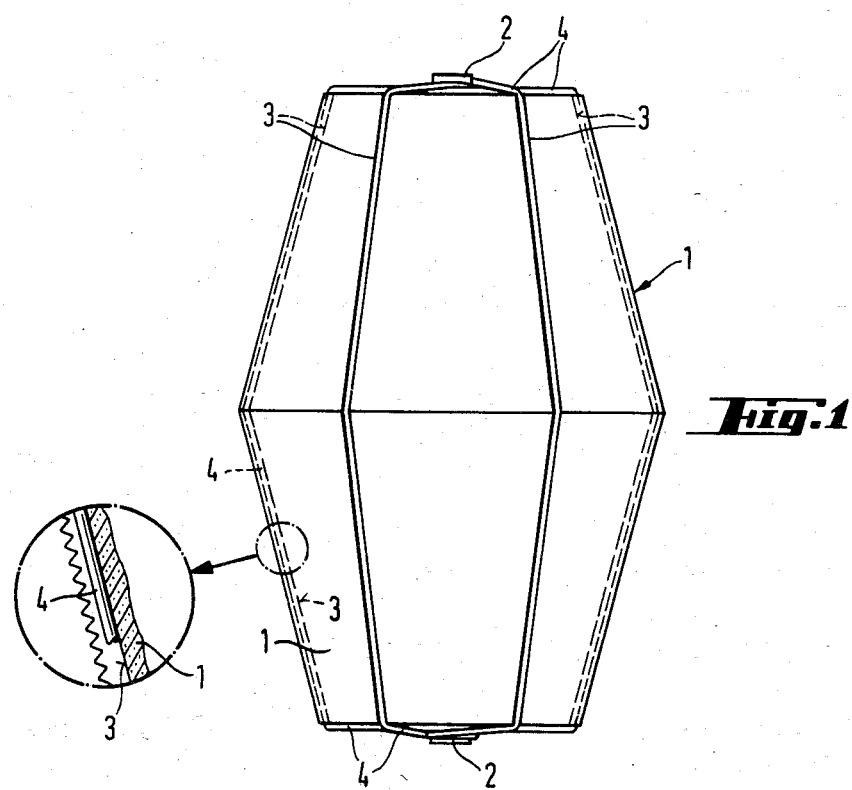
FIG. 1 diagrammatically illustrates a threaded graphite nipple in which graphite yarn is deposited under stress into slit-like notches which are deeper than the screw threads of the nipple.

Graphite electrodes for arc furnaces are composed of several electrode sections which are connected to each other by threaded nipples. The nipples and/or the electrode sections are reinforced by graphite filament yarn which surrounds the electrode parts frictionally. The yarns are drawn into notches or holes in the electrode parts and connected to the parts by adhesives which are thermally stabilized. Yarns wound on the cylinder surface of the electrode sections are protected by a coating of temperature and oxidation-resistant substances.

At least part of a graphite electrode of the type mentioned at the outset is wound with graphite filament yarn, and the yarn is tensionally connected to the electrode part.

The term "graphite filament yarn" is meant to include yarns which consist substantially of carbon and are produced by pyrolysis of pitch fibers, polyacrylonitrile or other carbonizable filaments, and which have been subjected to a heat treatment in the temperature range of about 1,000° to 2,500° C. The yarns are temperature-resistant; and their tensile strength is about 0.2 GPa and more. Advantageously, multifilament yarns with a titer of about 10 to 400 ktex are used, and preferably because of the cost-effective processing, multifilament yarns with a titer of 300 to 350 ktex. The use of graphite fibers with a synthetic resin matrix, for instance plates, tubes, cylinders and the like, is known. The reinforcing of carbon bodies with a matrix formed from synthetic resins or pitches by carbonizing is also known. The processes used for reinforcing such elements, however, are not suitable, for the reasons mentioned above, for the fabrication of fiber-reinforced electrode sections and threaded nipples of graphite. The reinforcement effect of the graphite fibers, however, can be achieved according to the teachings on which the invention is based, if the reinforcing fibers are no longer distributed throughout the volume of the electrode more or less uniformly, but are wound in the form of filament yarn around the parts of the graphite electrode, at least partially. According to one preferred embodiment of the invention, the threaded nipples and the electrode sections of the electrode are wound with graphite filament yarn. The reinforcement is adapted to the individual electrode parts by the amount of yarn and the direction of the group e.g. a first group of yarn may be parallel to the longitudinal axis and a second group of yarn may run perpendicular to the first group, to the actual stress of the individual electrode parts. Particularly advantageous is the arrangement of the yarn in two groups, one group running substantially parallel to the longitudinal axis and one group running more or less tantentially, which approximately coincide with the primary stress directions. Stressing of the yarn which is fixed by cement joints or tie rods on the electrode parts is preferred. According to another preferred embodiment of the invention, electrode sections and threaded nipples provided with stress-relieving slots are wound with the reinforcing filament yarn. The slots and notches provided for stress relief also serve advantageously as guides of the yarn. According to another embodiment, the threads of the threaded nipple themselves serve as the guide of the reinforcing filament yarn. The threads of the nipple are accordingly made deeper to provide space for receiving the yarn without interference with the function of the nipple to connect electrode sections. Yarns wound on the outer cylinder surface of the electrode sections are exposed in the operation of the electrode to attack by air oxygen and other substances which gradually destroy the yarns. The yarn is therefore provided with a coating of oxidation-resistant and temperature-resistant substances; the coating should also cover the entire cylinder surface. Such refractory coatings on graphite electrodes for the reduction of surface burnup are known. Generally, however, the adhesion of the coatings is not sufficient and it has therefore been proposed to add to the coating layers, fibers in the form of short fibers or in the form of net-like fabrics for improving the adhesion and for lowering the frequency of cracks (DE-OS No. 27 22 438). The fiber inserts are not suitable for producing stress in the parts of the graphite electrode. On the other hand, the yarn winding also serves according to the invention as a carrier or adhesion substrate for refractory coatings and thereby improves the effectiveness of the surface coating. The nipple is pre-stressed for adaptation to the actual stress of the electrode parts, for instance by winding with graphite filament yarn, and the adjacent wall of the electrode box is slotted for stress relief or, according to another embodiment, the cores of the electrode sections are pre-stressed and a ring-shaped zone of the section enclosing the core is provided with slots which start at the outside surface. The combination of pre-stress by the frictional looping of the electrode parts with graphite filament yarn and stress relief by slotting the electrode parts results in a particularly effective reduction of the breaking rate.

In the manufacture of the graphite electrode according to the invention, graphite filament yarn is preferably applied under pre-stress to the threaded nipple and/or the electrode sections. The pre-stress is advantageously 10 to 20% of the tensile strength, corresponding to about 0.1 to 0.2 GPa. The yarn is secured in the usual manner with clamps, wedges and other locking means and subsequently cemented to the electrode parts. According to one preferred embodiment, the yarn is deposited in the threads of the threaded nipple.

According to another method, at least the threaded nipples are provided with notches, which notches each have a common plane with the longitudinal axis of the nipple, and which notches have a depth which is greater than the depth of the thread of the screw thread. Alternatively, at least two holes are provided which run substantially in the axial direction. The notches and holes serving as guides of the fiber bundles are worked into the finished nipple or, advantageously, are cut into the screw thread of a raw nipple and thereafter the yarn is applied. The customary impregnation with pitch can be used for cementing the yarn and the nipple together, thereby eliminating a separate cementing step. According to another embodiment, the electrode sections are provided with substantially axial holes; pretensioned filament yarns are pulled into the hole, are cemented to the electrode section and the adhesive is thermally stabilized. Suitable adhesives are flowable carbonizable substances, such as pitches and hardenable resins, for instance phenolformaldehyde resin, which form coke layers with very good adhesion. The graphite filament yarns are impregnated with the adhesive, for instance, by an immersion treatment in a pitch or resin bath. Advantageously, the impregnation is combined with the application or winding of the yarn onto the electrode parts, i.e., the unwinding yarn runs through an immersion bath which is arranged ahead of the take-up device. The yarn can also be applied dry and the adhesive can be put on in situ by spraying, brushing and the like. To make a durable temperature-resistant bond between the electrode parts and the reinforcing yarn it is necessary to bring the adhesive into a thermally stable form. The wound electrode parts are heated up for this purpose, the temperature and the duration optionally being modified by the addition of catalysts, or by the type of adhesive. For hardenable resins, the temperature is about 120° to 200° C. and the heating time is about 2 to 8 hours. For the final solidification, a further heat treatment, in the following called thermal stabilization is employed, in which coke bridges between the reinforcing yarns and the electrode parts are formed by pyrolysis of the adhesive. The temperature required for this process step is at least 800° C. However, a separate temperature treatment is not as a rule necessary since the adhesive is thermally stabilized in an arc furnace if the electrode is used as intended. It was found that the adhesive carbonized and solid coke bridges or joints are formed between the stretched yarn and the graphite electrode. The cylinder surfaces of electrode sections which are wound, and after the reinforcing yarn is fixed, are advantageously provided with a coating of high-melting oxidation-resistant substances which are applied, for instance, by flame or plasma spraying. Suitable substances are primarily refractory carbides and silicides alone or mixed with high-melting oxides and fluxes. The coating should completely cover at least the wound-on yarn, to preclude damage by oxidation or erosion.

The known winding devices and methods are suitable for winding the threaded nipples and electrode sections with graphite filament yarns. The winding speed is advantageously 10 to 50 m/s; the pre-stress is about 1 to 2 $N/mm^2$. The axial holes provided for winding the cores of the nipples and electrode sections have a diameter of about 8 to 12 mm. The yarn is pulled through and the ends are fixed by wedges or clamps. Overall, the share of the reinforcing yarn in the weight of the electrode parts is advantageously 0.1 to 1.0% and in particular 0.2 to 0.5%.

The operating efficiency of the electrode wound with graphite filament yarn is substantially improved primarily by stress relief. With frictional connection of the pre-stressed yarn and the electrode, the breaking load is increased by about 50 to 100%. If, in conjunction with the pre-stressing of the electrode, the buildup of stress peaks is limited by slotting and notching, the breaking probability of the electrode, and in particular of the electrode connection can be lowered to less than one-half of the amount applicable to customary graphite electrodes. The substantially lower breakage rate is particularly significant allowing increased trouble-free operation of arc furnaces, the electrodes of which are subjected to particularly high stresses, for instance, UHP furnaces and furnaces with water-cooled electrodes.

Figure 2:
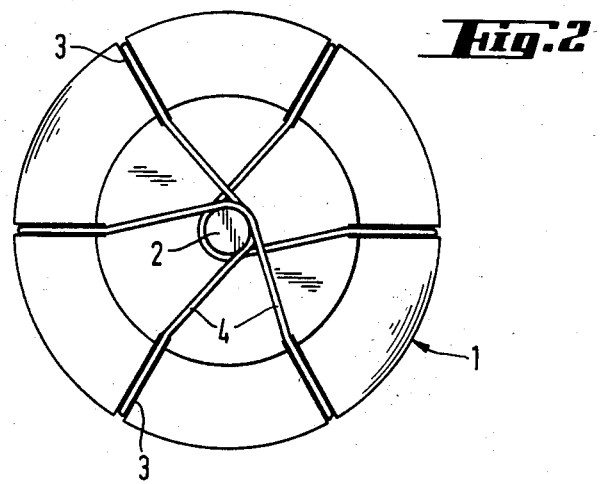
FIG. 2 is a top view of the nipple according to FIG. 1.

In FIGS. 1 and 2, a double-conical graphite nipple is schematically shown in cross sections. The nipple body 1 has pins 2 in the end faces. The conical surfaces of the nipple are provided with slot-like notches 3 which are deeper than the screw thread, shown graphically only in an enlarged detail drawing. The graphite filament yarn 4 is drawn into the notches. The yarn is deflected during the winding around the pins 2.

A graphite nipple with an equatorial diameter of 317 mm and a length of 355 mm was provided with 6 slots 4×10 mm as described above; a resin-impregnated graphite multifilament cable (320 kfil, tensile strength 3 GPa) with a pre-stress of about 0.5 GPa is wound-on and the phenolformaldehyde resin is thermally stabilized by heating the nipple. The thus treated graphite nipple with a fiber content of 0.35%, had a breaking stress about 70% higher than that of an unreinforced nipple.

Figure 3:
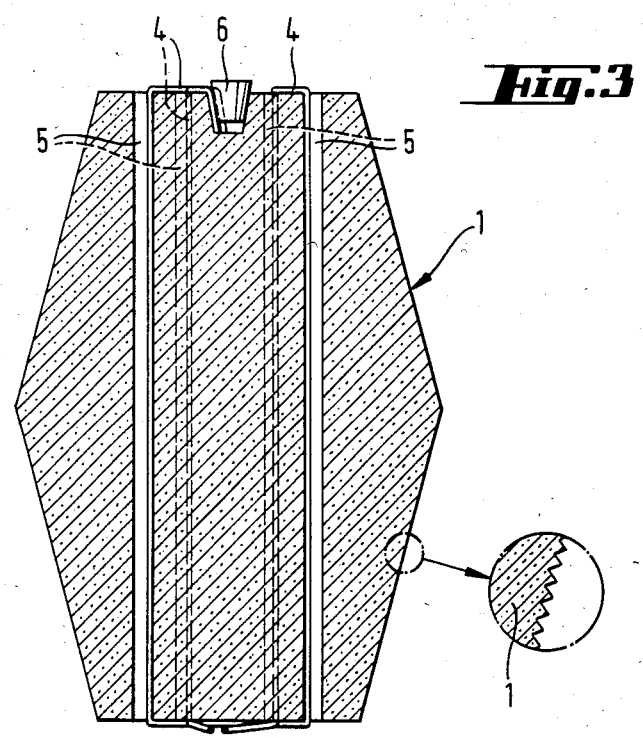
FIG. 3 illustrates a longitudinal section of a nipple with holes through which yarn is wound, and a wedge for fixing an end of the yarn.
Figure 4:
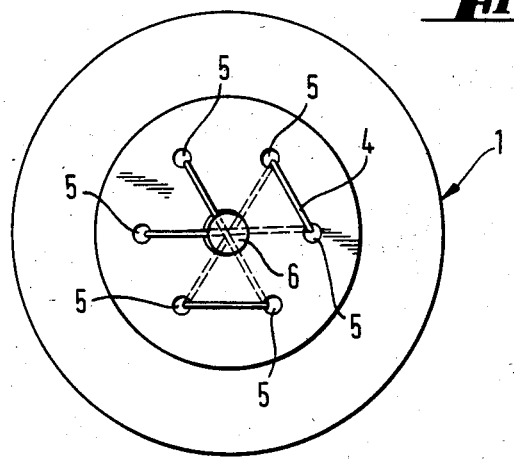
FIG. 4 is a top view of the nipple according to FIG. 3.

FIGS. 3 and 4 show a different graphite nipple, i.e. a nipple with holes 5 for receiving the reinforcing graphite filament yarn 4. The yarn is fixed by the wedge 6.

Figure 5:
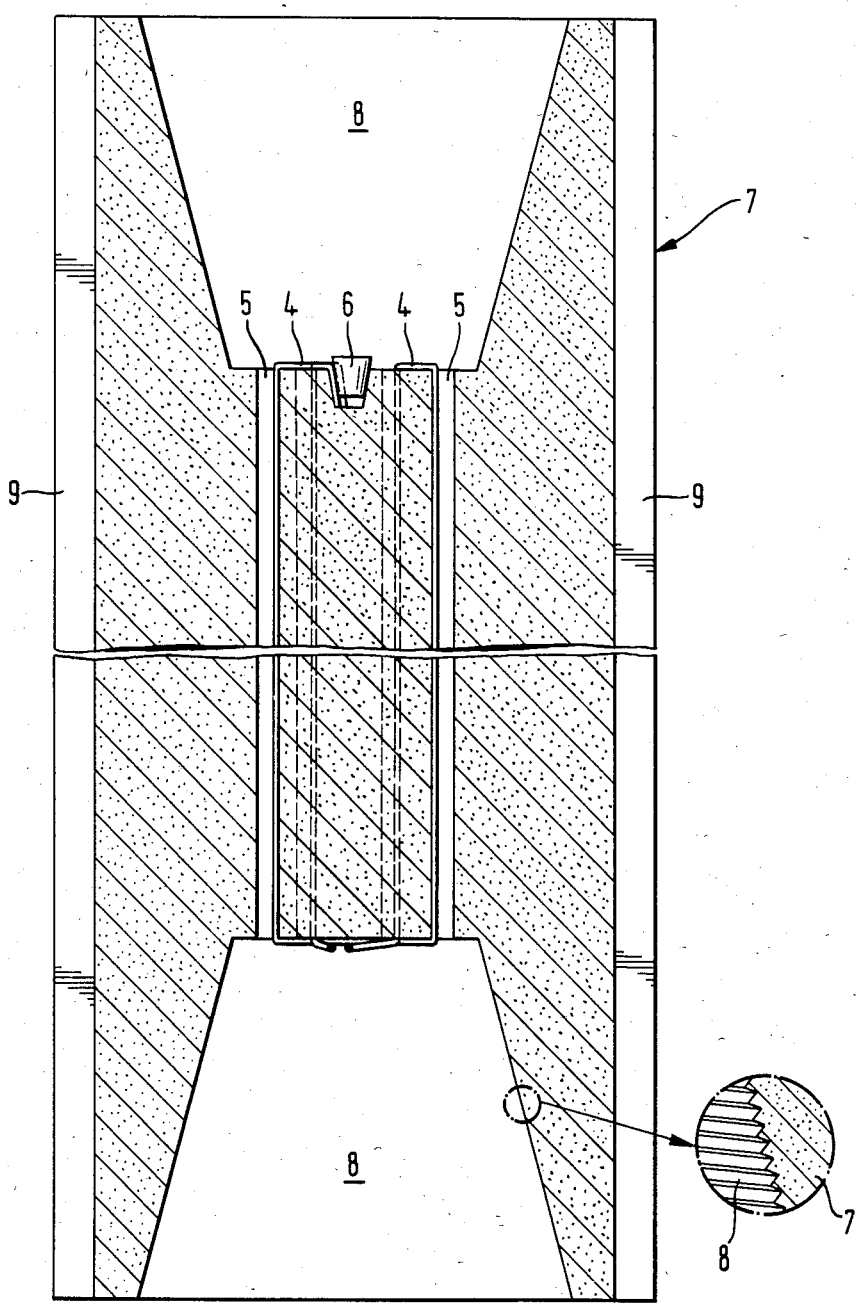
FIG. 5 illustrates a longitudinal section of an electrode section with a yarn-wound core.

A fiber-reinforced electrode section is shown schematically in FIG. 5. The electrode section 7 is provided with holes 5 which extend parallel to the longitudinal axis between the bottoms of the box-like recesses or sockets 8. The drawn-in graphite filament yarn 4 is secured by the wedge 6. Slots 9 in electrode section 7 minimize buildup of stress peaks. An electrode section with a diameter of 600 mm and a length of 2,000 mm was provided with 6 holes; graphite filament yarn of the abovedescribed nature was drawn in and the impregnated resin was thermally stabilized. With a fiber content of 0.2%, the tensile strength of the thus reinforced electrode section was about 90% higher than that of the unreinforced electrode section.

Figure 6:
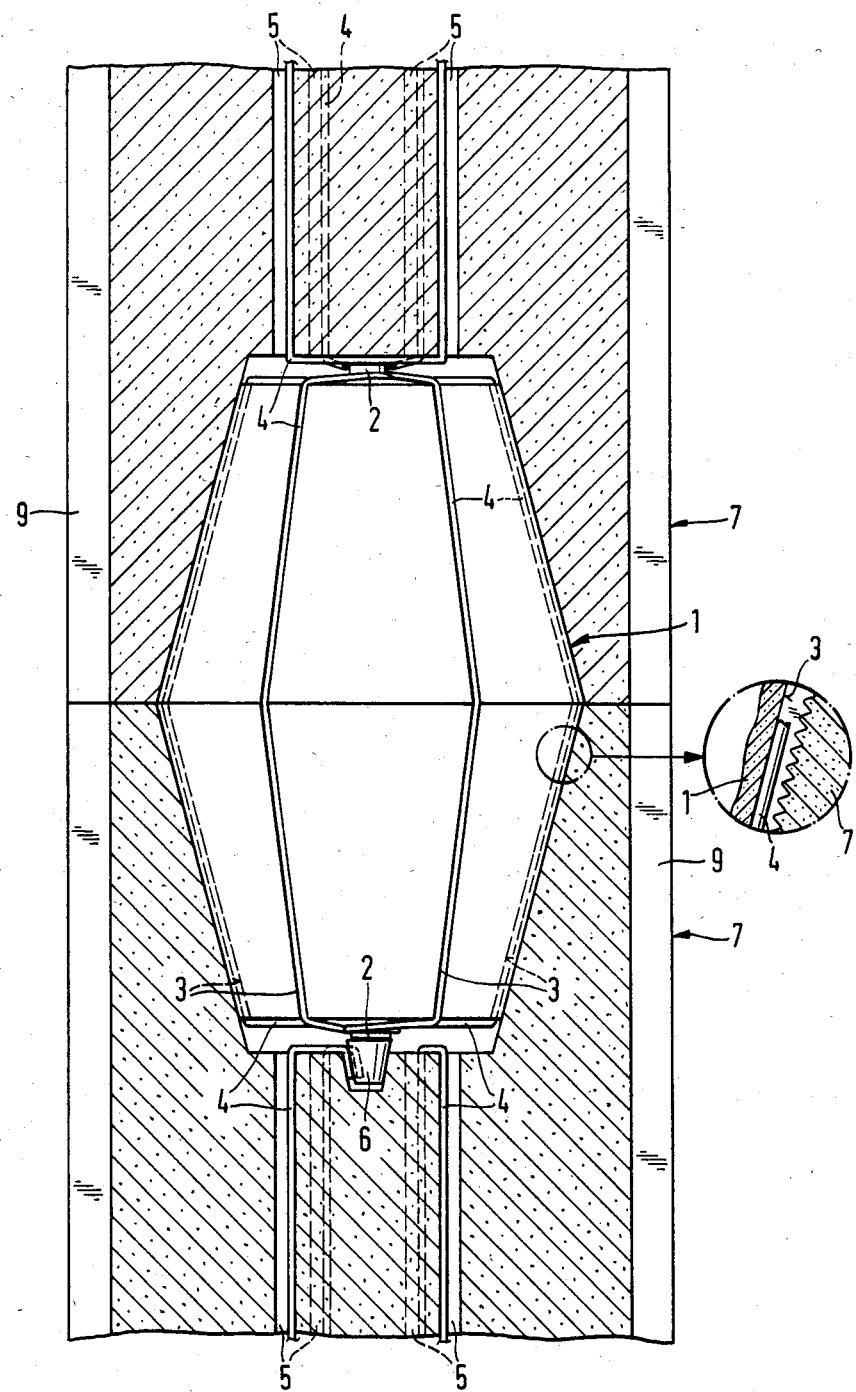
FIG. 6 illustrates a longitudinal section of an electrode in which a graphite nipple connects two electrode sections.

FIG. 6 shows schematically two graphite electrode sections 7 which are connected by the threaded nipple 1 and are provided with notches 3 or holes 5 for receiving the pre-stressed graphite filament yarn 4. The slots 9 made in the electrode sections are to limit the buildup of stress peaks due to temperature changes in the operation of the electrode.

The foregoing is a description corresponding, in substance, to German application No. P 34 18 934.3, dated May 22, 1984, international priority of which is being claimed for the instant application, and which is hereby made part of this application. Any material discrepancies between the foregoing specification and the specification of the aformentioned corresponding German application are to be resolved in favor of the latter.

There are claimed:

1. Graphite electrode for arc furnaces composed of electrode graphite parts comprising a plurality of graphite electrode sections connected by threaded graphite nipples, with at least one electrode graphite part having a plurality of graphite filament yarn stretched around and tensionally connected to the electrode part.

2. Graphite electrode according to claim 1, wherein the threaded graphite nipple has the longitudinally-running graphite filament yarn tensionally connected to the graphite nipple.

3. Graphite electrode according to claim 1, wherein the graphite electrode section has the longitudinally running graphite filament yarn tensionally connected to the graphite electrode section.

4. Graphite electrode according to claim 1, wherein the threaded nipples and the electrode sections have the longitudinally-running graphite filament yarn.

5. Graphite electrode according to claim 1, wherein the graphite filament yarn runs in slot-like notches in the bottom of the thread of the threaded nipple.

6. Graphite electrode according to claim 1, wherein graphite filament yarn runs through longitudinally-running holes in the graphite nipple.

7. Graphite electrode according to claim 1, wherein graphite filament yarn runs through longitudinally-running holes in the graphite electrode section.

8. Graphite electrode according to claim 1, wherein the graphite filament yarn is prestressed.

9. Graphite electrode according to claim 1, wherein the yarn is a multifilament yarn.

10. Graphite electrode according to claim 1, wherein the titer of the yarn is 300 to 350 ktex.

11. A threaded graphite nipple for an electric arc furnace electrode comprising a plurality of graphite electrode sections connected by threaded graphite nipples, in which graphite filament yarn is tensionally connected to the threaded graphite nipple.

12. Graphite nipple according to claim 11, wherein the graphite filament yarn is disposed in the bottom of the thread of the threaded nipple.

13. Graphite nipple according to claim 11, wherein the graphite filament yarn is disposed in holes in the threaded nipple.

14. Graphite electrode section for an electric arc furnace electrode comprising a plurality of graphite electrode sections connected by threaded graphite nipples, in which graphite filament yarn is disposed in holes in the graphite electrode section and tensionally connected to the graphite electrode section.

15. Graphite electrode filament according to claim 1, wherein in addition to the longitudinally-running graphite filament yarn, at least part of the electrode has disposed thereon a second graphite yarn which are perpendicular to the longitudinally-running graphite filament yarn.

16. Graphite electrode according to claim 15, wherein said second graphite filament yarn is wound on the cylinder surfaces of the electrode sections and the wound surfaces are provided with an oxidation-resistant coating.

17. Graphite electrode according to claim 1, wherein at least the electrode sections are provided with slots which run parallel to the longitudinal axis.

18. Graphite electrode according to claim 15, wherein at least the electrode sections are provided with slots which run parallel to the longitudinal axis.

19. In a method for manufacturing a graphite electrode for arc furnaces by connecting a plurality of graphite electrode sections with threaded graphite nipples, the improvement comprising, prior to connecting a threaded graphite nipple to graphite electrode sections, depositing graphite filament yarn under prestress into the threads of the threaded graphite nipple, cementing the yarn and the threaded nipple to each other with an adhesive, and heating to thermally stabilize the adhesive.

20. Method according to claim 19, wherein the threaded nipples are notched, and the graphite filament yarn is deposited under prestress into the notches.

21. Method according to claim 19, wherein the threaded nipples are provided with holes, and the graphite filament yarn is deposited under prestress into the holes.

22. In a method for manufacturing a graphite electrode for arc furnaces by connecting a plurality of graphite electrode sections with threaded graphite nipples, the improvement comprising, forming axial holes in a graphite electrode section prior to connecting the electrode section to a threaded nipple, drawing prestressed graphite filament yarn into the holes, cementing the yarn to the electrode section with an adhesive, and heating to thermally stabilize the adhesive.

23. Method according to claim 19, wherein the adhesive is a hardenable resin.

24. Method according to claim 22, wherein the adhesive is a hardenable resin.

25. Method according to claim 23, wherein the adhesive is stabilized thermally in an arc furnace if the electrode is used as intended.

26. Method according to claim 24, wherein the adhesive is stabilized thermally in an arc furnace if the electrode is used as intended.

27. Method according to claim 19, wherein the cylinder surface of the electrode sections is wound with graphite filament yarn, the yarn is cemented to the electrode sections and the wound surface is provided with a high-melting oxidation-resistant coating.

28. Method according to claim 22, wherein the cylinder surface of the electrode sections is wound with graphite filament yarn, the yarn is cemented to the electrode sections and the wound surface is provided with a high-melting oxidation-resistant coating.

* * * * *